Sept. 12, 1961 W. D. ALLISON 2,999,694
SPRING SUSPENSION FOR MOTOR VEHICLES
Filed April 12, 1954 2 Sheets-Sheet 1
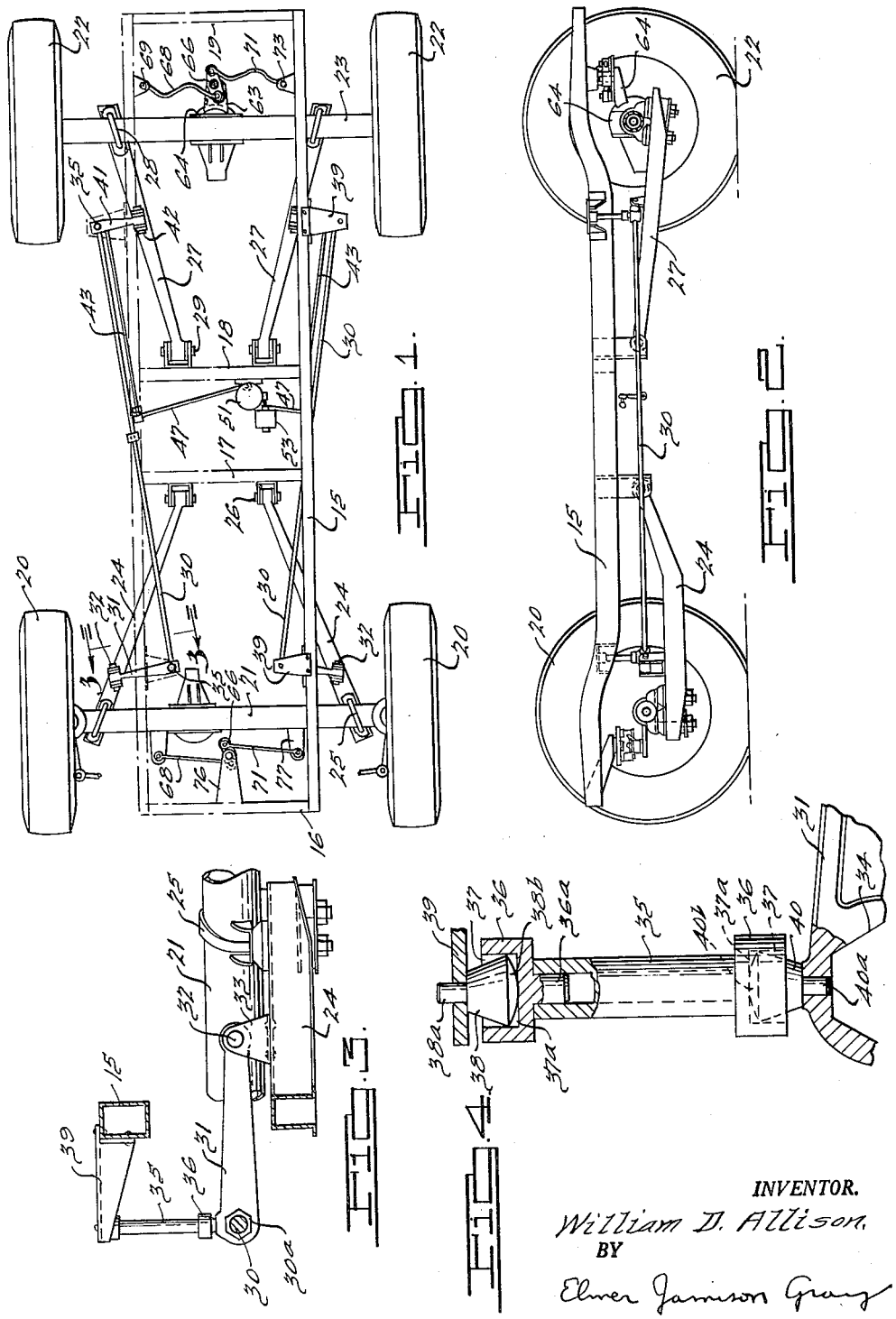
INVENTOR.
William D. Allison
BY
Elmer Jamison Gray
ATTORNEY.

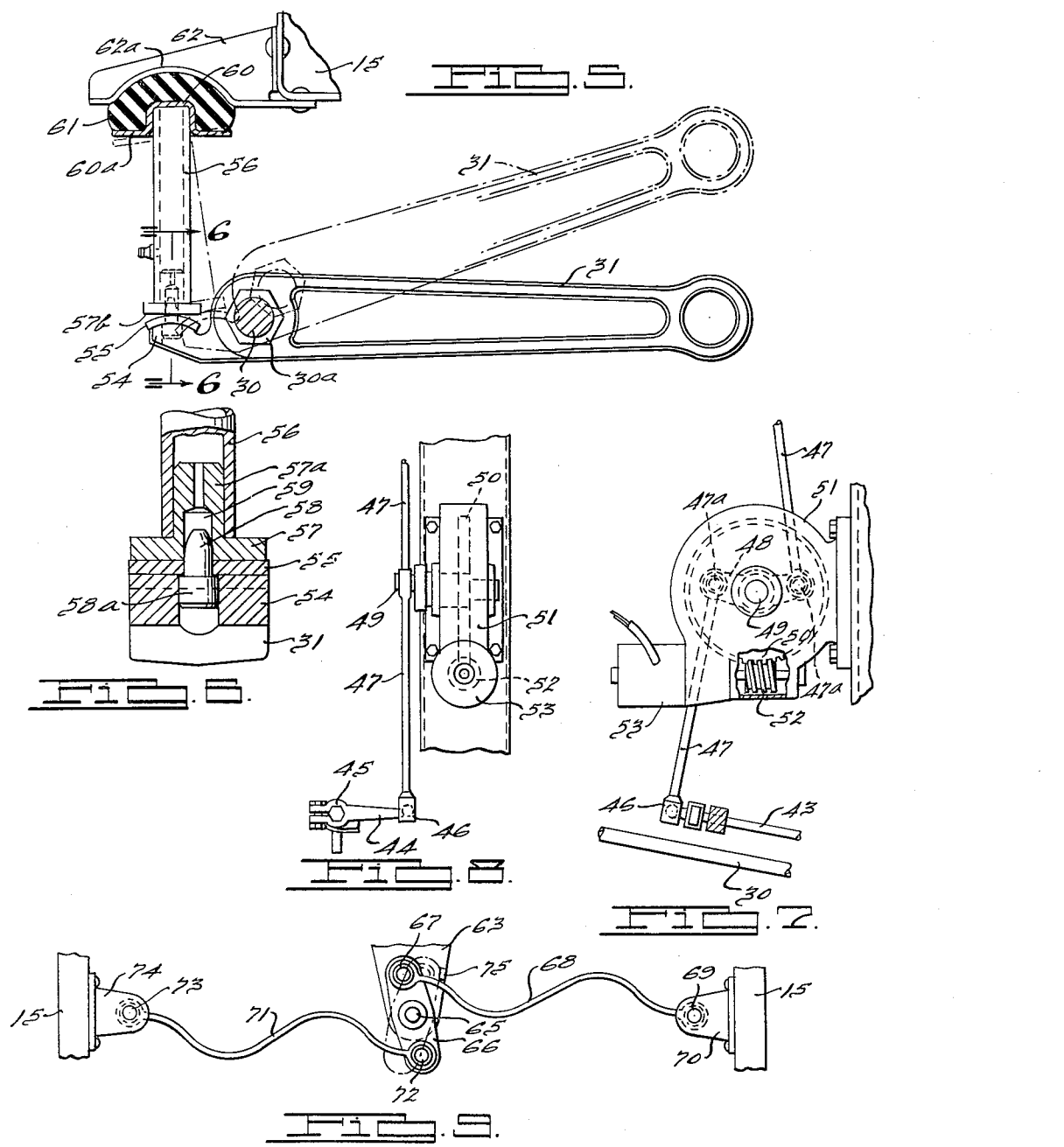

United States Patent Office 2,999,694
Patented Sept. 12, 1961

2,999,694
SPRING SUSPENSION FOR MOTOR VEHICLES
William D. Allison, 39 Radnor Circle,
Grosse Pointe 36, Mich.
Filed Apr. 12, 1954, Ser. No. 422,371
21 Claims. (Cl. 280—104)

This invention relates to motor vehicles and particularly to spring suspensions therefor. The invention is applicable to various types of motor vehicles such as automobiles of the so-called pleasure or passenger types, busses, trucks, ambulances and commercial vehicles. For the purposes of illustration the invention has been shown herein as embodied in a motor vehicle having a chassis or frame structure adapted to be utilized in a passenger or pleasure type vehicle.

One of the principal objects of the invention is to provide a spring suspension for a motor vehicle capable of providing smooth riding characteristics under various conditions of vehicle operation, maintaining the vehicle substantially level at all times, increasing the comfort of the passengers regardless of rough roads over which the vehicle may travel, and rendering the vehicle relatively safe to handle on curves and over rough terrain while also reducing materially stresses and strains to which the frame is subjected under operating conditions.

In the illustrated embodiment of the present invention the spring suspension embodies a main spring means, preferably torsion bar or torsional spring means, connecting a front and a rear wheel of the vehicle in such manner as to enable vertical forces to be transmitted in corresponding directions to the vehicle frame adjacent opposite ends thereof in response to vertical motion of either wheel. In addition to the foregoing the spring suspension embodies compensating means, which may be spring means of the torsional kind, operable to supplement or modify the spring effort or resistance of the main spring means so as to levelize the frame under conditions where an increase in static load is placed at one or either end of the vehicle.

The main spring suspension, which is shown as comprising torsional spring means for each pair of front and rear wheels at a side of the vehicle, is connected to the front and rear wheels by means of swinging levers or lever arms. This torsional spring means common to a front and rear wheel is shown as comprising a torsion bar extending longitudinally of the vehicle. The swinging lever arms are attached to the front and rear ends of the main torsion bar and also are suitably connected to the front and rear wheels to respond to vertical displacement thereof.

An important feature of the present invention resides in the connections between the ends of the main torsion bar as well as the swinging levers to the frame structure of the vehicle. These connections are such that the ends of each main torsion bar are in effect "floating" since they have no direct bearing or pivotal mounting on the frame. Similarly the end of each swinging lever arm to which an end of the main torsion bar is attached has no direct bearing or pivotal mounting on the frame. Instead this end of the lever arm is spaced below the adjacent frame member. Loads or forces are transmitted from the spring attached end of the lever arm to the frame or vice versa by means of a vertically extending transmitting link or load member interposed between the end of the lever arm and frame. The bearing or connecting means between the upper and lower ends of the transmitting link and the frame and lever arm respectively are articulated or pivotal and are of such nature as to minimize friction at these points of connection. By thus providing these vertical articulate transmitting links or load members and "floating" the ends of the torsion bar, important advantages are achieved. Not only is it possible to obtain more accurate and sensitive load compensation in maintaining uniform vehicle level by minimizing frictional resistance, but considerable economies are achieved due to the elimination of costly needle bearings or anti-friction bearings and the necessity of time consuming precision alignment in the assembling of the bearings.

Other objects of this invention will appear in the following description and appended claims, reference being had to the accompanying drawings forming a part of this specification wherein like reference characters designate corresponding parts in the several views.

FIG. 1 is a fragmentary plan view of a motor vehicle chassis provided with a vehicle spring suspension constructed in accordance with the present invention.

FIG. 2 is a side elevation of the construction shown in FIG. 1 with the wheels at one side of the vehicle omitted.

FIG. 3 is a fragmentary vertical section taken substantially through lines 3—3 of FIG. 1 looking in the direction of the arrows.

FIG. 4 is an enlarged fragmentary view in elevation and partly in section illustrating the load strut or link means connecting an end of one of the swingable lever means with a part of the frame structure.

FIG. 5 is a view in part similar to FIG. 4 illustrating another embodiment of link or strut connection between the lever arm and the frame structure.

FIG. 6 is an enlarged fragmentary sectional view taken substantially through lines 6—6 of FIG. 5 looking in the direction of the arrows.

FIG. 7 is an enlarged fragmentary plan view illustrating the power actuated mechanism for varying the angular torsional deflection of the load compensating springs.

FIG. 8 is a side view of the construction shown in FIG. 7.

FIG. 9 is a fragmentary plan view illustrating the track bar linkage at the rear end of the vehicle.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the accompanying drawings, there is illustrated, by way of example, a vehicle chassis having road wheels supporting the frame or body through the medium of a spring suspension which in the present embodiment is preferably of the torsional or torsion bar kind. In the interest of clarity the vehicle superstructure or body and details of the power plant and driven mechanisms have been largely omitted from the drawings.

As illustrated the chassis or body frame is shown, by way of example, as comprising spaced longitudinal sills or main frame members 15 of box-like tubular construction rigidly connected together by means of suitable cross frame members 16, 17, 18 and 19. The vehicle is provided with a pair of front dirigible wheels 20, which may be driven if desired, and a pair of rear driven wheels 22. In the present illustrated embodiment the front wheels are connected by means of a solid type axle 21 and the rear wheels are similarly connected by means of a solid type axle 23. Although both pairs of wheels are connected by means of solid type axles it will be understood that either or both may be connected to the frame for independent vertical motion such, for example, as shown in my copending application Serial No. 413,253, now Patent No. 2,853,310, dated September 23, 1958.

With the front wheels 20 connected, by way of example, by means of axle 21 I prefer to provide a pair of rearwardly converging torque arms 24 attached at their forward ends by means of yokes 25 to the outer ends of the axle 21 and pivotally connected at their rear ends at 26 to brackets carried by the cross frame member 17. From this construction it will be seen that the torque arms 24 will swing vertically in response to vertical motion of the front wheels. Since the rear wheels 22 are also connected by means of axle 23 I prefer to provide longitudinally extending forwardly converging torque arms 27 connecting the axle to the frame. Each torque arm 27 is attached at its rear end to the axle 23 by a yoke 28 and is pivotally connected at its forward end at 29 to a bracket secured to the cross frame member 18. As in the case of torque arms 24 the rear torque arms 27 will swing vertically in response to vertical motion of the rear wheels 22.

The main spring suspension for the vehicle in the illustrated embodiment comprises a longitudinal torsion bar 30 connected to the front and rear wheels at each side of the vehicle. The main torsion bars 30 may, as desired, be of solid or tubular construction and when installed are initially stressed by winding or twisting them angularly a predetermined amount up to, for example, 80° to 90° so as to support the sprung weight of the vehicle with the desired road clearance under no load conditions. A front swingable lever arm 31 is provided for and connected to each front wheel 20. In the illustrated embodiment, see particularly FIGS. 1 and 3, each lever arm 31 is pivotally connected at its outer end at 32 to a bracket 33 attached to the upper side of the associated torque arm 24 at a locality near the forward end thereof. Although the outer ends of the lever arms 31 are in the present instance pivotally connected to the torque arms 24 so as to swing up and down in response to vertical motion of the front wheels, it will be understood that these load levers may be attached to other parts of the wheel supporting structure such as directly to the axle or to a lower swinging wheel suspension arm such as shown in my above referred to application. The inner enlarged end of each lever arm 31, see FIG. 4, is provided with a hex socket 34, and the adjacent end of each torsion bar 30 is upset to provide an enlarged hex portion 30a splined or keyed within the socket 34. It will be seen from FIGS. 3 and 4 that the inner end of each lever arm 31 is vertically spaced below the adjacent frame member 15. In the embodiment of FIGS. 3 and 4 load transmitting means is interposed between the inner end of each lever 31 and the frame, this transmitting means being in the form of a tubular strut or load transmitting link 35 to the upper and lower ends of which similar enlarged cup shaped members 36 are rigidly secured as by means of pilot pins 36a fixed within the tubular ends of the strut 35. Each member 36 is provided with a cylindrical socket 37 the base of which is formed with a flat surface 37a. Projecting into the upper socket 37 is a bearing member 38 rigidly secured by a pin 38a to a bracket 39 riveted to the frame member 15 and extending inwardly therefrom. Projecting into the socket 37 of the lower cup-shaped member 36 is a bearing member 40 similar to the upper bearing member 38 and rigidly secured by a pin 40a to the end of the lever arm 31. The bearing members 38 and 40 are formed with arcuate or curved surfaces 38b and 40b respectively which bear against the flat surfaces 37a in rolling engagement therewith. Anti-friction bearings are thus provided between the ends of each strut or link 35 and the associated lever arm 31 and frame bracket 39 permitting the strut or link 35 to oscillate or pivot laterally in response to up and down swinging motion of the lever arms while reducing to a minimum the friction at the points of rolling engagement.

A pair of rear vertically swingable lever arms 41 are provided for and connected to the rear wheels 22. In the present embodiment, by way of example, the inner ends of these lever arms 41 are pivotally connected at 42 to the upper sides of the swingable torque arms 27.

The connections between the lever arms 41 and the torque arms 27 and between the outer ends of these lever arms and the main torsion bars 30 are identical to the corresponding connections of the front lever arms 31 and as shown in FIGS. 3 and 4, and accordingly a detailed description thereof is not deemed necessary. It will be seen, however, that the lever arms 31 and 41 at each side of the vehicle extend in opposite or reversed directions. As a consequence, up and down movement of a front wheel or a rear wheel will result in angular torsional deflection of the main torsion bar 30 in directions opposite to the angular torsional deflection thereof produced by corresponding up and down movement of the other wheel at the same side of the vehicle. Either lever arm 41 or 31 is, therefore, effective to torsionally deflect angularly the torsion bar 30 in opposition to the other lever arm, thereby transmitting vertical forces in corresponding directions to the frame adjacent opposite ends thereof in response to vertical motion of either wheel.

In the present embodiment of the invention the main spring suspension comprising the torsion bars 30 is supplemented by compensating means, preferably spring means of the torsional kind, at each side of the vehicle operable to vary or modify the spring effort or resistance of the main spring means so as to maintain the frame substantially level under conditions where changes in static load occur at one end or the other of the vehicle. In the present instance the compensating means is provided at the rear of the vehicle and comprises a torsion bar 43 for each rear wheel. The spring torsion bars 43, as in the case of the main torsion bars 30, are selected as to cross-sectional size and torsional characteristics to suit the particular vehicle, each compensating torsion bar being preferably of less diameter or cross-sectional size than the associated main torsion bar since normally it is only required to exert appreciably less torsional resistance than the associated main torsion bar. The compensating torsion bars for the rear wheels function to increase or decrease the spring resistance at the rear wheels so as to maintain the front and rear of the frame at substantially a constant level. In preferred practice the compensating torsional spring means may be torsionally deflected in one direction to supplement the main torsional spring means and increase the torsional effort or spring resistance at the rear wheels or may be deflected in the opposite direction either to decrease the spring resistance at the rear wheels or reduce the torsional effort exerted by the main torsional spring means. Where desired it will be understood that the compensating spring means may be duplicated for the front wheels and operated in the same manner as hereinafter described.

In the present embodiment each compensating torsion bar 43 extends parallel to and alongside the associated main torsion bar 30 and the rear end is upset to provide an enlarged hex portion keyed or rigidly secured within a correspondingly shaped socket near the outer end of the lever arm 41. The attachment of the rear end of each bar 43 to the lever 41 is similar to the attachment of the main torsion bar to each of the lever arms. The forward end of each compensating bar 43 is provided with a similar enlarged hex portion keyed or rigidly secured within a hex socket 45 in the lower end of a vertical lever 44, see FIG. 8. The upper end of each lever 44, to which the forward end of one of the compensating bars is attached, is provided with a ball and socket connection 46 with a horizontally extending transmitting link 47, see FIGS. 7 and 8. The inner end of each transmitting link 47 has an articulate or pivotal connection 47a with a projecting end of an oscillatable lever 48 fastened midway thereof to a shaft 49 carrying a worm gear 50 mounted within a casing 51 provided with suitable bearings for the shaft 49. Meshing with the gear 50 is a worm 52 driven by an electric servo motor 53. In the present instance the reduction gearing and transmitting lever 48 connected to the inner ends of the links 47 are arranged at one side of the longitudinal center line of the frame so as to provide clearance for the propeller shaft of the vehicle. By reason of this construction one transmitting link 47 is longer than the other.

Upon operation of the compensating electric motor 53 in one direction or the other the transmitting links 47 will be simultaneously shifted outwardly or inwardly thereby swinging the levers 44 and torsionally deflecting the compensating bars 43 to the desired extent so as to compensate for changes in static load on the frame and levelize the same. The operation of the compensating mechanism for varying the angular torsional deflection of the compensating bars 43 is substantially the same as described in my above mentioned copending application. Moreover, the compensating motor 53 is preferably actuated in one direction or the other through delayed action compensator switch mechanism similar to that shown and described in my said copending application.

In the embodiment of FIGS. 3 and 4 each load link 35 associated with each lever arm 31 and 41 provides two flat hardened ends or surfaces 37a, parallel to each other, and rolling between and against two spherical surfaces 38b and 40b. The walls of the cup-shaped members 36 in this embodiment embrace and retain the bearing members 38 and 40 so as to prevent the ends of the links 35 from shifting out of engagement with the bearing members should the operating angles of the links become excessive.

In the embodiment of FIGS. 5 and 6 there is shown an improved means for connecting the end of each lever arm 31, 41 with the frame structure. As shown in this embodiment the inner end of each lever arm 31 (which also applies to the outer end of each lever arm 41) is provided with an extension 54 beyond the connection of the torsion bar 30 to the lever arm. Attached to the upper arcuate face of the extension 54 is a hardened bearing piece 55 which provides a transverse cylindrical upper bearing surface. A bearing member 57 is rigidly secured to the lower end of a vertical tubular strut or link 56 by means of a pilot or insert portion 57a fixed within the end of the link. The bearing member 57 has a flat lower hardened bearing surface 57b extending the width of the bearing 55 and having rolling engagement therewith. The strut 56 and extension 54 are retained against relative lateral displacement and kept in alignment by a pin or dowel 58 having a tooth shape approximating an involute contour, this pin or dowel extending within a hole 59 in the bearing 57 and insert 57a. The lower end of the pin 58 projects through a hole in the bearing 55 and terminates in a head 58a rigidly fastened within a hole in the extension 54. By this construction the retainer pin 58 may freely oscillate within the hole 59 during relative motion of the lever arm and strut 56, such as indicated in broken lines in FIG. 5. The upper end of the strut or link 56 is confined within a socket in a retainer plate 60 provided with lateral wings 60a. A rubber or elastic cushion member 61 is interposed between the plate 60 and a curved socket 62a in a frame bracket 62 riveted to the frame member 15. The cushion or grommet 61 is held under predetermined compression between the parts 60, 60a and 62a and provides with the retainer plate 60 a yieldable articulate connection between the upper end of the strut or link 56 and the frame structure. In this embodiment it will be seen that the flat surface 57b and the upper cylindrical surface of the bearing 55 provide rolling contact on a line extending the width of the bearing. This construction of bearing is capable of much higher load capacity than the construction shown in FIGS. 3 and 4 and additionally provides a desired degree of flexibility or yieldability in the strut connection between the end of the lever arm and the frame structure.

Referring to FIGS. 1 and 9, there is provided at the rear end of the vehicle an improved track bar assembly which will maintain closely the lateral relation of the sprung and unsprung assemblies of the vehicle, especially under conditions where the wheels simultaneously pass over a change or a series of changes in elevation on the road. A bracket 63 having a generally horizontal rearward extension is rigidly attached to the axle or differential housing 64. Pivoted at 65 to this bracket is a generally horizontal equalizing lever 66. Pivoted at 67 to the forward end of the lever 66 is the inner end of a track bar or link 68 which is preferably serpentine or bowed in its length. The outer end of the track bar 68 is pivotally connected at 69 to a bracket 70 attached to the side of one of the frame members 15. A second track bar or link 71 is pivotally connected at its inner end at 72 to the rear end of the equalizing lever 66. The track bar 71 is also preferably serpentine or bowed in its length, and the outer end of this bar is pivotally connected at 73 to a bracket 74 rigidly secured to the side of one of the frame members 15. The equalizing lever 66 is arranged angularly with respect to the longitudinal axis of the vehicle and during up and down motion of both rear wheels the lever in response to the pull of the track bars 68 and 71 will oscillate in one direction between the full line and broken line positions of FIG. 9. Thus, the pivotal connections 67 and 72 between the inner ends of the track bars and the equalizing lever 66 will move laterally in opposed directions across a generally horizontal line passing axially of the vehicle through the axis 65 of the lever. A stop 75 is provided on the bracket 63 for limiting the range of pivotal motion of the lever 66. The stop 75 is important in preventing extreme rotative movement of the equalizing lever. For example, if the rear axle should drop free, such as in the event the rear shock absorbers are broken or disconnected, the stop 75 will limit the fall of the axle due to the engagement of the lever 66 with the stop. It is preferred that the connections at opposite ends of the track bars be cushioned. This may be accomplished by interposing rubber-like grommets or articulate cushioning sleeves between the eyes at opposite ends of each track bar and the pivot studs embraced by these eyes at the localities of the pivots 67, 69, 72 and 73.

In the present embodiment as shown in FIG. 1, a track bar assembly similar to that above described is also provided at the front of the vehicle. However, the equalizing lever in the front track bar assembly is pivotally mounted on a bracket 76 attached to the frame cross member 16 and the outer ends of the track bars are pivotally connected to brackets 77 attached to the front axle 21. Although the track bars 68 and 71 at the front are shown straight, it will be understood that they may be bowed or serpentine as in the case of the track bars at the rear of the vehicle. It will be seen that the equalizing lever 66 at the rear of the vehicle is pivotally or articulately mounted on the axle housing forming part of the unsprung assembly and the outer ends of the track bars 68 and 71 are pivotally or articulately connected to the frame, forming part of the sprung assembly. As distinguished from this construction, the equalizing lever 66 at the front of the vehicle is pivotally mounted on a bracket 76 forming part of the sprung assembly, and the outer ends of the track bars are pivotally connected to the axle, forming part of the unsprung assembly. The operation of the two embodiments at the front and rear of the vehicle are, however, principally the same, other than the additional advantage achieved at the rear of the vehicle by forming the track bars serpentine or bowed in their lengths.

It will be understood that up and down movement of the body in response to rise and fall of the axle and rear wheels will result in the pivots 67 and 72 of the track bars following arcuate paths having their respective centers of curvature at the pivots 69 and 73 of the outer ends of the bars. At the same time pivot 65 of the equalizing lever, during oscillation thereof, will follow substantially a straight line vertical path equidistant at all points from the frame members 15. Hence, upon a change of elevation of both wheels the lateral relation of the axle to the body or frame is maintained substantially constant.

Important advantages are achieved by virtue of the longitudinal resiliency of the track bars due to the bowed or serpentine formation thereof. The endwise resilient bars allow relative lateral yieldable displacement of axle and body under conditions where one wheel is displaced vertically relatively to the other wheel. They cushion the side thrust consequent to vertical movement of one end of the axle and absorb and minimize shock and body vibration. The resilient construction of the bars also provides a notable safety factor under conditions where the automobile negotiates curves or sharp corners, affording the vehicle increased stability and materially reducing wheel skid. The resilient connections between the body and axle afforded by the bars enables, when negotiating curves, the rear wheels to maintain better traction with appreciably less skidding or tendency to start skidding. When the car goes into a curve on the highway the body tends to move or shift outwardly due to centrifugal force thereby tending to carry or shift the wheels laterally with the body and to cause the wheels to skid. By virtue of the resilient track bar connections, however, relative lateral displacement of body and wheels is permitted, reducing the tendency of the wheels to start or go into a skid. The resilient action of the bars also minimizes the amount or degree of skidding under extreme conditions and also is effective in exerting spring forces assisting in restoring the body to its normal position relative to the axle.

I claim:

1. In a vehicle structure having front and rear wheels, swinging lever arm means for each wheel responsive to vertical motion thereof, longitudinal torsional spring means common to said wheels and connected to said lever arm means for torsional deflection thereby, and means for vertically spacing a portion of one lever arm means from a part of the vehicle structure including a rigid vertical transmitting link having rolling articulate connections at opposite ends with said portion of the lever arm means and said part of the vehicle structure.

2. In a vehicle having a frame structure and front and rear wheels, a longitudinally extending torque arm connected at one end to one wheel and pivotally connected at its opposite end to the frame structure, up and down swingable lever means pivotally connected at one end to said torque arm, longitudinal torsional spring means attached to the opposite end of said lever means, said opposite end being vertically spaced from a part of the frame structure, and vertically extending load transmitting link means interposed between and having rolling articulate connections with said opposite end of the lever means and said part of the frame structure and effective to maintain said opposite end in vertically spaced relation to said part of the frame structure.

3. In a vehicle having a frame structure and front and rear wheels, a longitudinally extending torque arm connected at one end to one wheel and pivotally connected at its opposite end to the frame structure, up and down swingable lever means pivotally connected at one end to said torque arm, longitudinal torsional spring means common to the front and rear wheels attached to the opposite end of said lever means, said opposite end being vertically spaced from a part of the frame structure, and vertically extending load transmitting link means interposed between and having rolling articulate connections with said opposite end of the lever means and said part of the frame structure and effective to maintain said opposite end in vertically spaced relation to said part of the frame structure.

4. In a vehicle having a vehicle structure and front and rear wheels, swingable lever means for each wheel, longitudinal torsional spring means connecting said lever means, one lever means having at one end a bearing portion disposed at one side of the connection of the spring means thereto and vertically spaced from a part of the vehicle structure, a load strut interposed between said part of the vehicle structure and said bearing portion and having rolling line engagement with the latter and an articulate connection with the former, and means for retaining said strut in bearing engagement with said bearing portion.

5. In a vehicle having a frame and front and rear wheels, torsional spring means, swingable lever arm means for torsionally deflecting said spring means in response to up and down motion of a wheel, said lever arm means having a connection to the frame including a member having at one end a part in rolling surface engagement with a part of said lever arm means and at the opposite end a part in rolling surface engagement with a part of said frame.

6. A structure according to claim 5 wherein at least one of said parts has an arcuate engaging surface.

7. In a vehicle having a frame and front and rear wheels, torsional spring means, swingable lever arm means for torsionally deflecting said spring means in response to up and down motion of a wheel, vertically extending link means interposed between and operatively connecting said lever arm means and frame, the connection at each end of said link means including a pair of surfaces, one adapted to roll against the other.

8. In a vehicle having a frame and front and rear wheels, longitudinal torsional spring means common to said wheels, swingable lever arm means for torsionally deflecting said spring means in response to up and down motion of a wheel, said lever arm means having a connection to the frame including a member having at one end a part in rolling surface engagement with a part of said lever arm means and at the opposite end a part in rolling surface engagement with a part of said frame.

9. A structure according to claim 7 wherein means is provided for varying the torsional deflection of said torsional spring means to compensate for static load changes on the vehicle.

10. In a vehicle having a vehicle structure and front and rear wheels, up and down swingable lever arm means pivotally connected at one end to a wheel and responsive to vertical motion thereof, torsional spring means secured to said lever arm means adjacent another end thereof and adapted to be torsionally deflected in response to swinging motion of said lever means, and vertically extending transmitting link means interposed between and operatively connecting said last named end of the lever arm means and the vehicle structure, one end of said link means including a pair of surfaces, one adapted to roll against the other.

11. In a vehicle having a vehicle structure and front and rear wheels, up and down swingable lever arm means pivotally connected at one end to a wheel and responsive to vertical motion thereof, torsional spring means secured to said lever arm means adjacent another end thereof and adapted to be torsionally deflected in response to swinging motion of said lever means, said last named end of the lever arm means being spaced below an adjacent part of the vehicle structure, and rigid vertically extending strut means operatively connecting said end and said part of the vehicle structure, the operative connection at one end of said strut means including flat and arcuate surfaces in rolling engagement with each other.

12. In a vehicle structure having front and rear wheels, swinging lever arm means for each wheel responsive to vertical motion thereof, longitudinal torsional spring means common to said wheels and connected to said lever arm means for torsional deflection thereby, and means for vertically spacing a portion of one lever arm means from a part of the vehicle structure including a rigid vertical transmitting link having an articulate connection at opposite ends with said portion of the lever arm means and said part of the vehicle structure, one articulate connection including flat and arcuate surfaces in rolling engagement with each other.

13. In a vehicle structure having front and rear wheels, swinging lever arm means for each wheel responsive to vertical motion thereof, longitudinal torsional spring means common to said wheels and connected to said lever arm means for torsional deflection thereby, and means for vertically spacing a portion of one lever arm means from a part of the vehicle structure including a rigid vertical transmitting link having an articulate connection at opposite ends with said portion of the lever arm means and said part of the vehicle structure, one articulate connection including flat and arcuate surfaces in rolling engagement with each other and the other articulate connection including yieldable means.

14. In a vehicle having a vehicle structure and front and rear wheels, up and down swingable lever arm means pivotally connected at one end to a wheel and responsive to vertical motion thereof, torsional spring means secured to said lever arm means adjacent another end thereof and adapted to be torsionally deflected in response to swinging motion of said lever means, said last named end of the lever arm means being vertically spaced from an adajcent part of the vehicle structure, and a rigid load transmitting member pivotally connecting said end and said part of the vehicle structure, the pivotal connection of the load transmitting member including surfaces in rolling engagement with each other, articulate means being provided for retaining said surfaces in engagement.

15. In a vehicle having a sprung assembly for supporting a load, the combination of an arm attached to the sprung assembly, a wheel-connected arm attached to the sprung assembly for oscillatable swinging movement relative thereto in the vicinity of the first named arm, one of said arms being spring connected, said arms each providing recess forming means and together having a common interconnecting link presenting a recess paired with each of the arm recesses with the recesses of each pair being opposed to one another in a registering relationship of closely spaced adjacency, and a compresison bearing joint including a pair of studs connected with each pair of recesses, respectively; one stud of each pair having a rounded end portion engaging a bearing surface formed near the end of the other stud of each pair at a single point of rolling contact.

16. In a vehicle having a sprung assembly for supporting a load, the combination of an arm attached to the sprung assembly, a wheel-connected arm attached to the sprung assembly for oscillatable swinging movement relative thereto in the vicinity of the first named arm, one of said arms being spring connected, said arms each providing recess forming means and together having a common interconencting link presenting a recess paired with each of the arm recesses with the recesses of each pair being opposed to one another in a registering relationship of closely spaced adjacency, and a compression bearing joint including a pair of studs pressed into each pair of recesses, respectively; one stud of each pair having a spherically shaped nose portion and the other stud of each pair having a cup shaped end portion with a flat bottom bearing surface which is adapted to receive and engage the spherical nose portion of said one stud at a single point of rolling contact.

17. In a vehicle having a sprung assembly for supporting a load, the combination of an arm attached to the sprung assembly, a wheel-connected arm attached to the sprung assembly for oscillatable swinging movement in the vicinity of the first named arm, one of said arms being spring preloaded, said arms each having recess forming means affixed thereto and together having a common tensioned link for interconnecting the same and presenting a recess paired with each of the arm recesses with the recesses of each pair being opposed to one another in a registering relationship of closely spaced adjacency, and a compression bearing joint including a pair of studs pressed into each pair of recesses respectively; one stud of each pair having a rounded end portion and the other having a cup shaped end portion with a flat bottom bearing surface, the latter being adapted to receive and engage the rounded end portion of said one stud at a single point of rolling contact.

18. Compression bearing joint in a vehicle suspension for supporting the free ends of two members at least one thereof being pivotally mounted, comprising a pair of studs connected respectively to the free ends of said members in substantially aligned relation, one stud of each pair having a rounded end and the other stud having a cup shaped end portion with a flat bottom bearing surface which is adapted to receive and engage the rounded portion of said one stud at a single point of rolling contact, and spring means connected to at least one of said members for maintaining said pair of studs in close engagement.

19. In a vehicle structure having front and rear wheels, swinging lever arm means for a wheel responsive to vertical motion thereof, torsional spring means connected to said lever arm means, and means for vertically spacing a portion of said lever arm means from a part of the vehicle structure including a rigid vertical transmitting link having articulate connections at opposite ends with said portion of the lever arm means and said part of the vehicle structure, each articulate connection comprising surfaces in rolling engagement with each other.

20. In a vehicle having a sprung assembly for supporting a load, the combination of an arm attached to the sprung assembly, a wheel-connected arm attached to the sprung assembly for oscillatable swinging movement relative thereto in the vicinity of the first named arm, one of said arms being spring connected, said arms having a common interconnecting link, the connection between an end of said link and one of said arms including a pair of surfaces in rolling engagement with each other at a single point of rolling contact.

21. In a vehicle having a sprung assembly for supporting a load, the combination of an arm attached to the sprung assembly, a wheel-connected arm attached to the sprung assembly for oscillatable swinging movement relative thereto in the vicinity of the first named arm, one of said arms being spring connected, said arms having a common interconnecting link, the connection between an end of said link and one of said arms including a pair of surfaces in rolling engagement with each other and interlocking means for holding said surfaces in rolling engagement.

References Cited in the file of this patent
UNITED STATES PATENTS

| Number | Name | Date |
| --- | --- | --- |
| 1,764,237 | Applebaker | June 17, 1930 |
| 1,970,859 | Lenze | Aug. 21, 1934 |
| 2,459,394 | Sawtelle | Jan. 18, 1949 |
| 2,607,610 | Allison | Aug. 19, 1952 |
| 2,607,611 | Allison | Aug. 19, 1952 |
| 2,621,058 | Oster | Dec. 9, 1952 |
| 2,702,194 | Alden | Feb. 15, 1955 |